(12) United States Patent
Jackson

(10) Patent No.: US 8,708,636 B2
(45) Date of Patent: Apr. 29, 2014

(54) RECIPROCATING SLAT FOR USE ADJACENT TO TRAILER WALL

(75) Inventor: Daniel W Jackson, Madras, OR (US)

(73) Assignee: Keith Manufacturing Co., Madras, OR (US)

(*) Notice: Subject to any disclaimer, the term of this patent is extended or adjusted under 35 U.S.C. 154(b) by 730 days.

(21) Appl. No.: 12/748,283

(22) Filed: Mar. 26, 2010

(65) Prior Publication Data
US 2011/0236168 A1  Sep. 29, 2011

(51) Int. Cl.
B60P 1/00 (2006.01)
B65G 25/06 (2006.01)

(52) U.S. Cl.
CPC .................... B65G 25/065 (2013.01)
USPC ...... 414/509; 414/510; 198/750.2; 198/750.3

(58) Field of Classification Search
CPC ..................................... B65G 25/065
USPC .............. 414/509, 510; 198/750.2, 750.3
See application file for complete search history.

(56) References Cited

U.S. PATENT DOCUMENTS

| 5,096,356 | A  | * | 3/1992  | Foster ........................ 414/325 |
| 6,513,648 | B1 | * | 2/2003  | Hallstrom et al. ......... 198/750.4 |
| 6,651,806 | B2 | * | 11/2003 | Hallstrom ................... 198/750.3 |
| 6,782,994 | B1 | * | 8/2004  | Foster ........................ 198/750.2 |
| 7,374,034 | B2 | * | 5/2008  | Foster ........................ 198/750.3 |
| 8,083,052 | B2 | * | 12/2011 | Drago et al. ............... 198/750.4 |
| 2005/0118008 | A1 | * | 6/2005 | Gabe ........................... 414/525.1 |

* cited by examiner

Primary Examiner — Scott Lowe
(74) Attorney, Agent, or Firm — Bruce A. Kaser

(57) ABSTRACT

An improved outer reciprocating floor slat for use in a truck trailer or the like. The outer floor slat is located adjacent to a trailer's side wall. The floor slat has a portion that extends laterally upwardly and outwardly until it reaches the trailer's side wall at an elevation above the normal load-carrying floor elevation of the reciprocating floor slats. The upwardly extending portion facilitates material movement away from the corner region where the reciprocating floor normally intersects the trailer's side walls.

2 Claims, 6 Drawing Sheets

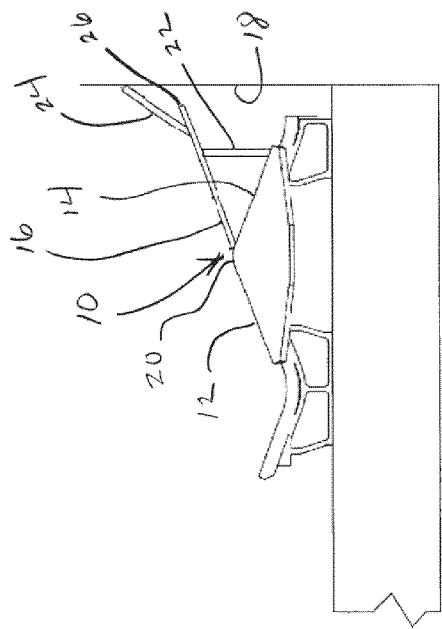
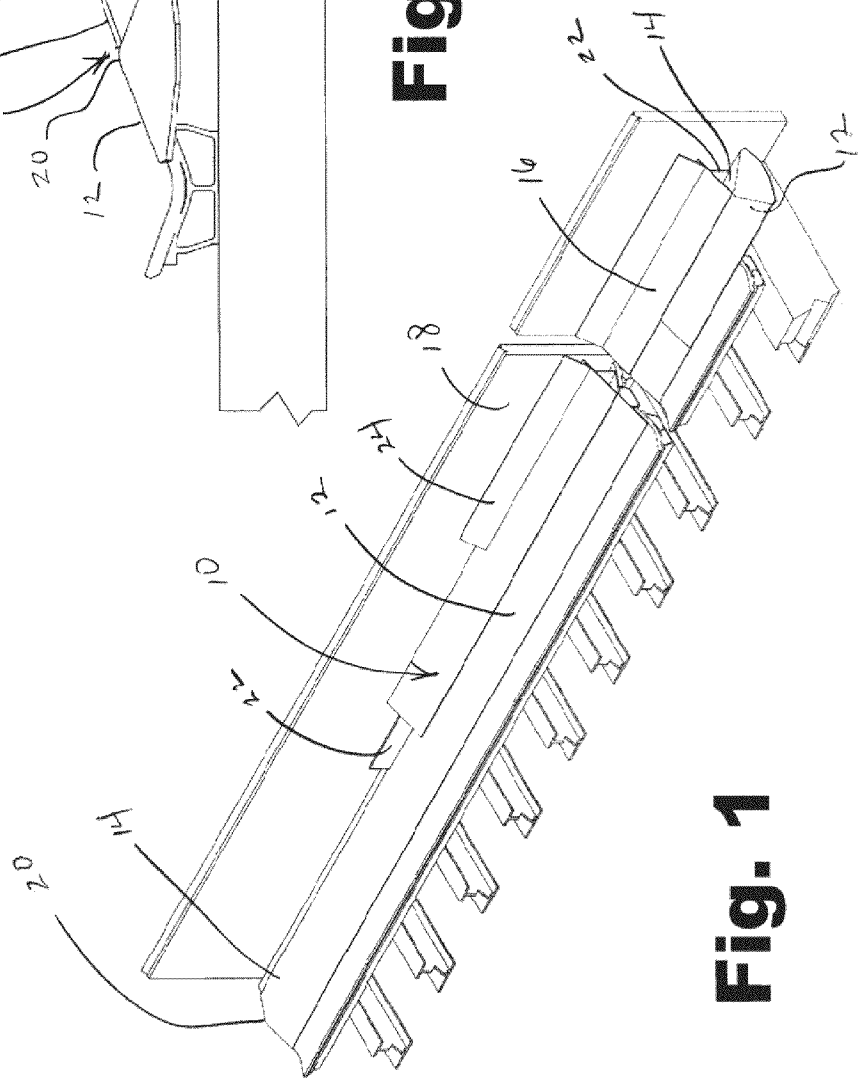

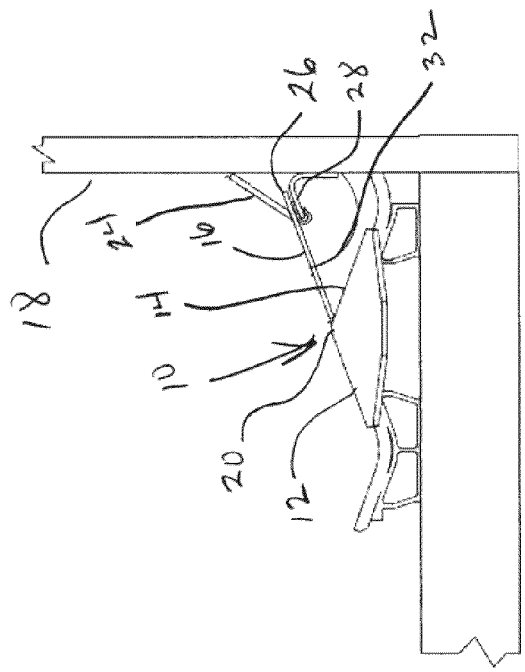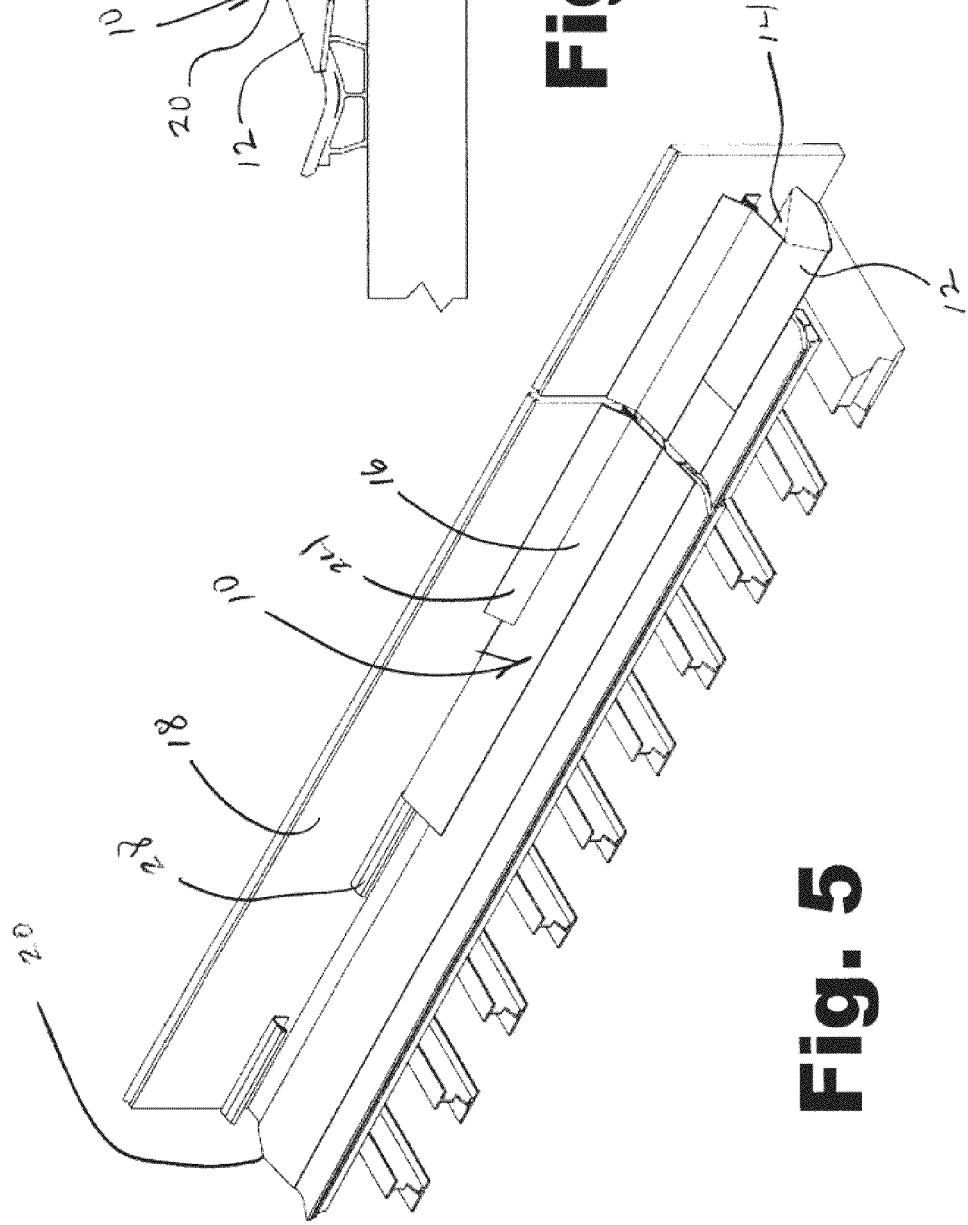

RECIPROCATING SLAT FOR USE ADJACENT TO TRAILER WALL

TECHNICAL FIELD

The present invention relates to reciprocating slat conveyors. More particularly, it relates to a reciprocating slat conveyor for use in truck trailers, or the like, where a reciprocating slat is immediately adjacent to the base of a trailer's side wall.

BACKGROUND OF THE INVENTION

U.S. Pat. No. 7,374,034 ("the '034 patent") describes a reciprocating slat conveyor system that is adapted to carry loads like asphalt. Each reciprocating slat described in the '034 patent has an inverted "V" shape that creates a series of peaks and valleys from one lateral side of the conveyor to the other. This design is typically built into the floor of a truck trailer. It is common to have a gap or "trough" on each lateral side of the slats, between the outer-most reciprocating slat and the trailer's wall. When carrying and unloading certain kinds of material, the trough tends to hold or capture the material in a way such that the floor will not clean out completely as the reciprocating slats inch the load out the back of the trailer.

The clean-out problem is linked to the type of material hauled by the conveyor. Reciprocating slat conveyors were originally developed to haul silage and similar materials that held together, almost like a loaf, as the load was inched off the trailer. Clean-out was not a significant problem with these older uses.

In more recent years, these types of conveyors have been used in trailers designed to carry heavy loads consisting of rock and other looser materials like gravel or even grain. The design described in the '034 patent is an example of a more recent design for these newer load-carrying applications. Loose material like gravel or small rock sometimes becomes trapped between the edge of the conveyor system and the base of the trailer's side wall. The loose material then tends to grind structural elements as the outer-most slats reciprocate back and forth next to the trailer's side wall.

Good trailer bed clean-out is desirable for different reasons. First, the hauler wants the floor swept clean, particularly when the same trailer (with a reciprocating slat system) is used to haul different kinds of loads. Second, good clean-out addresses the grinding problem described above.

The design described here is an improvement to the clean-out problem described above.

BRIEF SUMMARY OF THE INVENTION

The invention is intended to be used in combination with a plurality of reciprocating floor slats that unload material held between parallel side walls of a trailer, or the like. The reciprocating floor slats serve as a load-carrying floor between the trailer's walls. As is well-known, the reciprocating floor slats inch the load out the back of the trailer in lieu of using a tilt-type trailer with a hoist.

The improvement disclosed here relates to the outer-most or outer reciprocating slat that is positioned on each lateral side of the normal arrangement of many reciprocating floor slats spanning the width of the trailer. In other words, the improvement described here relates to the slat that is nearest each trailer side wall.

The outer reciprocating slat includes a load-bearing surface that reciprocates like the others except, as mentioned above, it is adjacent to the trailer side wall. The load-bearing surface includes a portion that extends laterally, along the full length of the slat, and upwardly and toward the trailer's side wall. Preferably, the laterally and upwardly extending portion is a sloped surface that directs material away from the corner area that is normally defined by the intersection of the trailer's wall and the reciprocating floor slat system.

The laterally and upwardly extending portion of the outer slat has a lateral edge that terminates near the trailer's side wall, in a manner so that the edge is above the normal load-carrying floor elevation of the plurality of reciprocating floor slats (i.e., the moving slats that are inward of the outer slat on each side wall). This design facilitates the prevention of material from being captured between the outer slat and the trailer wall. While it may be preferred to slope the laterally and upwardly extending portion, there may be other variations that work the same way so long as the elevation of the slat's lateral edge is above the normal elevation of the floor.

The invention as summarized above will become better, understood upon review of the following drawings and the detailed description.

BRIEF DESCRIPTION OF THE DRAWINGS

Like reference numerals used in the drawings designate like parts throughout the several views, and wherein:

FIG. 1 is a perspective view of an improved outer reciprocating slat constructed in accordance with a preferred embodiment of the invention;

FIG. 2 is an end view of the slat shown in FIG. 1;

FIG. 5 is a perspective view like FIG. 1, but shows an alternative slat edge design;

FIG. 6 is an end view of the outer slat illustrated in FIG. 5;

BEST MODE FOR CARRYING OUT THE INVENTION

Figure 3:
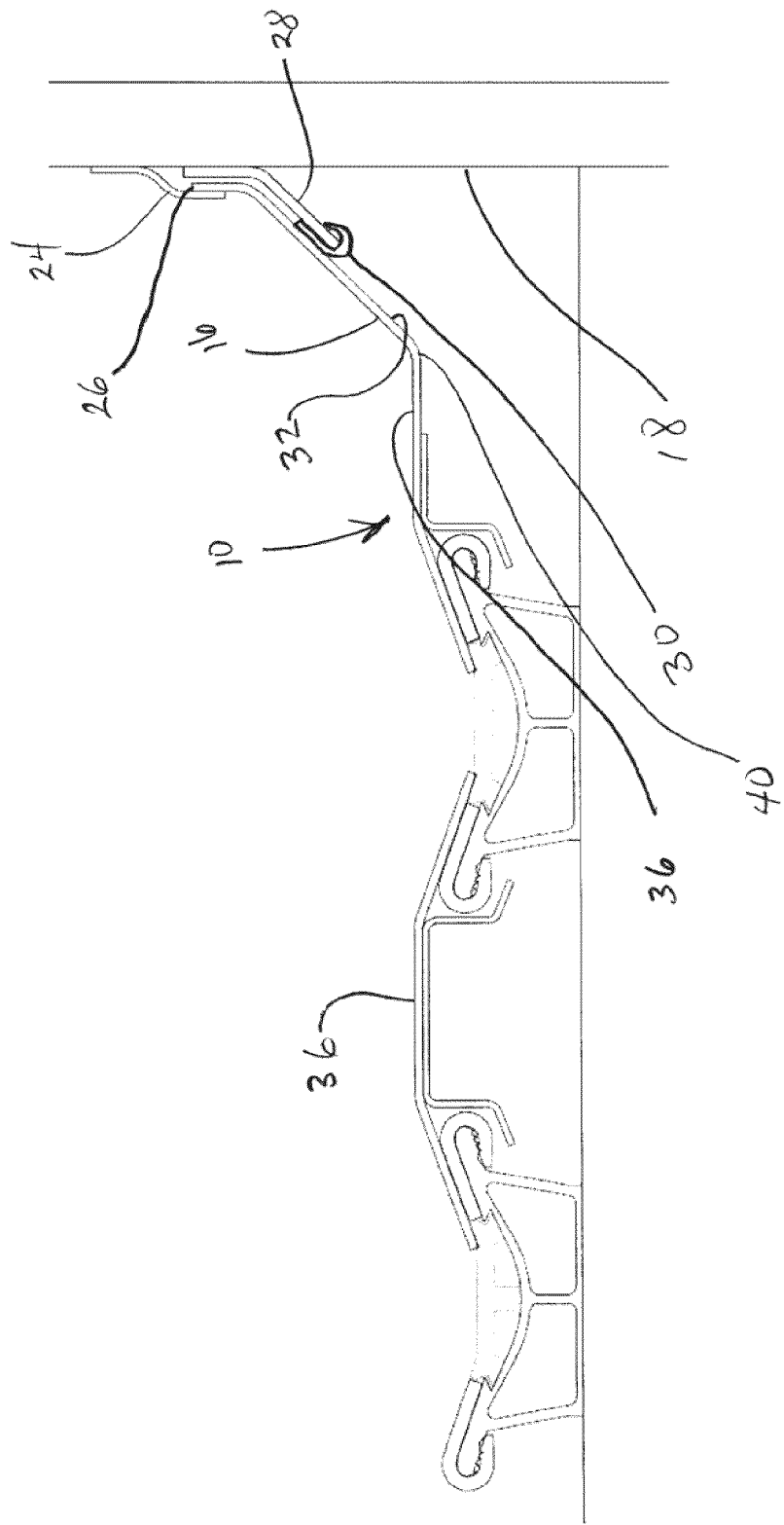
FIG. 3 is a view like FIG. 2, but shows both the outer-most slat and an inner slat that is the next one in relative to the plurality of load-carrying reciprocating slats or surfaces that make up a reciprocating slat conveyor system.

Referring now to the drawings, and first to FIG. 1, shown generally at 10 is an outer reciprocating slat constructed in accordance with a preferred embodiment of the invention. For background purposes, attention is directed to U.S. Pat. No. 7,374,034 (the '034 patent"), the teachings of which are incorporated herein by reference.

The preferred embodiment described here is intended to improve the reciprocating floor slat arrangement taught in the '034 patent. Referring to FIG. 1 of the '034 patent, for example, reference numeral 46 defines a trough between the outer-most reciprocating slat and the inside base of the trailer wall (the trailer wall is not numbered). This creates a situation where certain kinds of materials are trapped in the trough 46 and will not move unless they are subsequently cleaned out.

Returning now to FIG. 2 of the present case, the outer-most reciprocating slat 10 may or may not be constructed with the same slightly inverted "V" configuration (illustrated in the '034 patent) defined by sloping surfaces 12, 14. However, regardless of the specific cross-sectional configuration of the slat, the slat 10 includes a portion 16 that extends laterally and upwardly toward the trailer's side wall 18.

As is generally apparent from FIG. 1, the laterally and upwardly extending portion 16 is intended to be built into the entire length of the slat 10. However, FIGS. 1 and 5 illustrate the upwardly extending portion 16 falling short of the aft end of the slat (in the direction toward where the trailer's forward bulkhead is normally located). This was done in the drawings for illustrative purposes so that the reader can see the structure below portion 16.

One way to manufacture the slat 10 is to weld the upwardly extending portion 16 to the peak 20 of the slat 10. In such case, a vertical piece 22 will be added for support purposes. As the skilled person would know, there are alternatives that might include extruding the load carrying surface from a single piece of material with no welding. This is generally illustrated at 40 in FIG. 3.

In the embodiments shown in FIGS. 1 and 2, the laterally and upwardly extending portion 16 extends under a lip piece 24 that slopes down to and overlaps the upper surface of portion 16. The purpose is to put the edge 26 as near to the side wall 18 as possible without gaps for material to fall through. FIGS. 3-6 show alternative ways of putting the edge 26 of portion 16 near the trailer's side wall 18.

Figure 4:
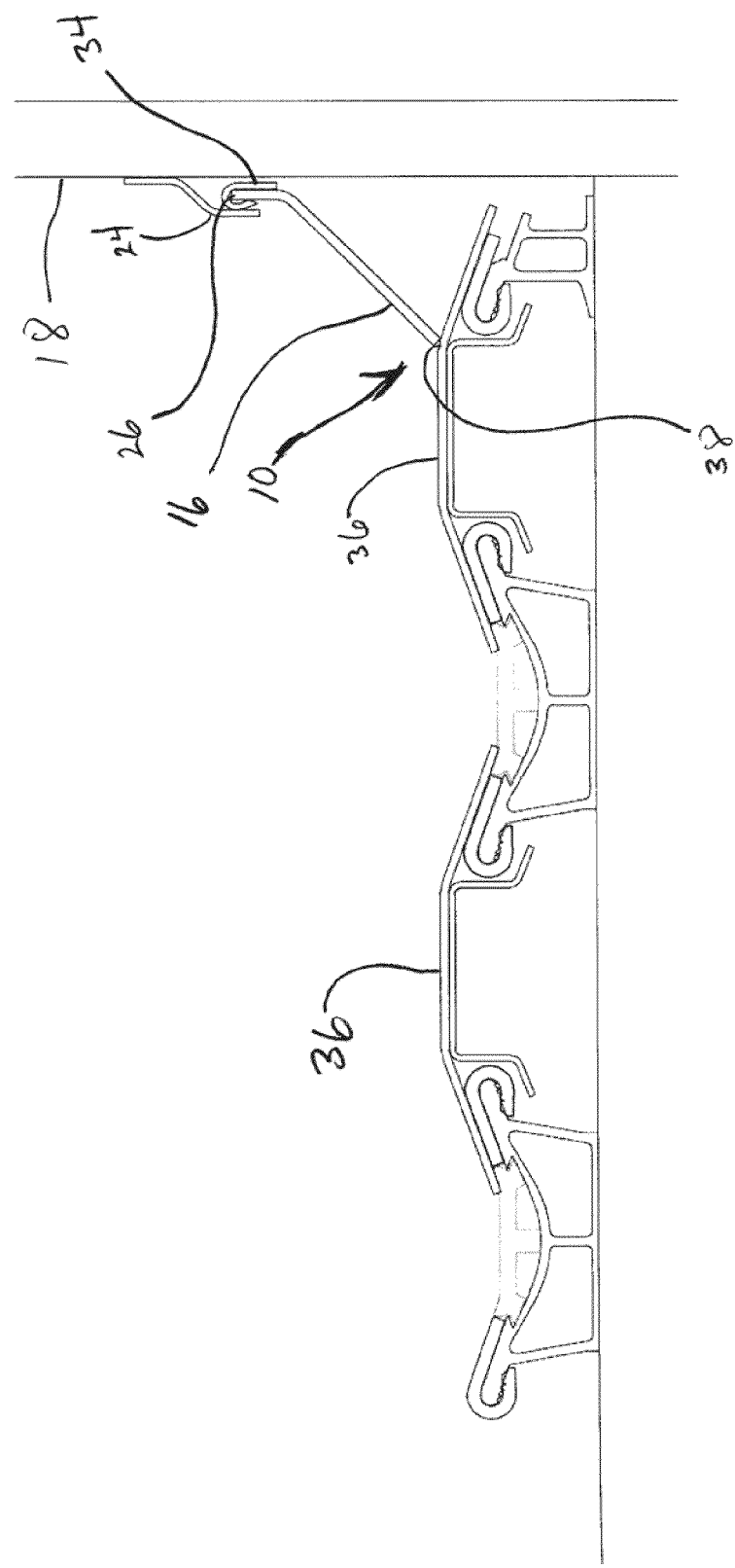
FIG. 4 is a view like FIG. 3, but shows an alternative slat way of connecting the outer-most slat to the trailer's side wall.

Referring now to FIG. 3, for example, the upper edge 26 is sandwiched between lip 24 and another bearing surface 28. A "J" bearing 30 may facilitate sliding movement between the underside surface 32 of portion 16 and supporting element 28. FIG. 4 shows another version where the "J" bearing 30 is moved upwardly and captures the outer edge 26 of portion 16.

FIGS. 3 and 4 also show a different style of reciprocating floor slats that have a flat tabletop 36 in lieu of the peak 20 described earlier with respect to FIGS. 1-2 and 5-6. In this alternative configuration, the upwardly extending portion 16 (see FIG. 4) is welded, as shown at 38, to one side of the flat surface 36. Flat versus peaked configurations are a matter of design choice that depend on intended floor uses.

In all cases, regardless of the version used, the different embodiments described above, eliminate the problem of capturing material in the trough between the outer-most slat and the trailer's side wall 18. The outer end 26 of upwardly extended portion 16 has a higher elevation than the normal load-carrying elevation of the floor slats going from one side of the trailer to the other. In other words, in the "peaked" example described above, the normal floor elevation may be approximated as the location of each peak 20 going laterally across the floor. Likewise, in the flat-top configuration, the normal elevation of the load-bearing surfaces are defined by the elevation of the flat load-carrying surfaces 36. By positioning edge 26 sufficiently above the normal elevation of the load-carrying platform, it ensures that material will be directed inwardly away from the base edges of the trailer's side walls and the trailer will empty in better fashion relative to earlier versions of reciprocating floor designs.

Figure 7:
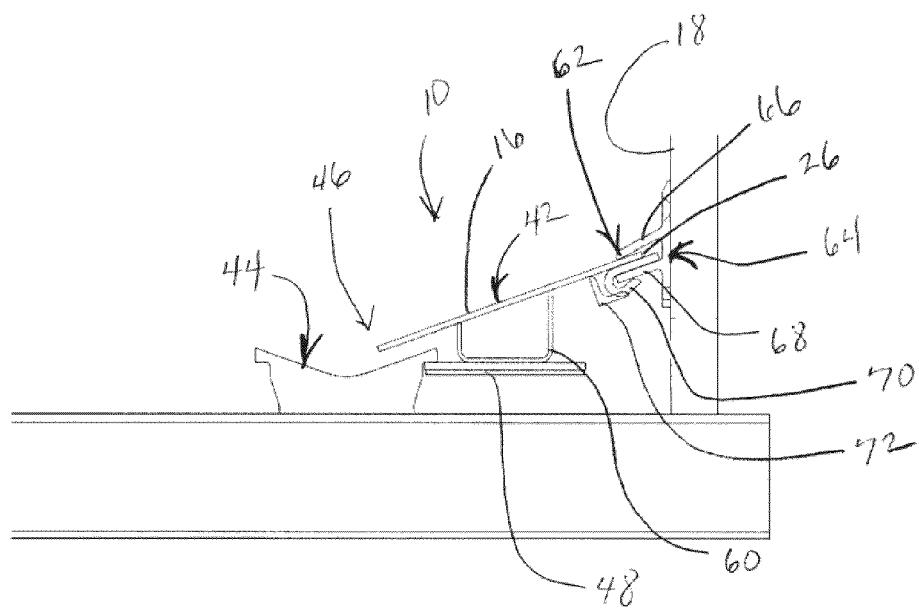
FIG. 7 is a view like FIGS. 2 and 6, but shows an alternative embodiment of an outer reciprocating slat constructed in accordance with the invention.
Figure 8:
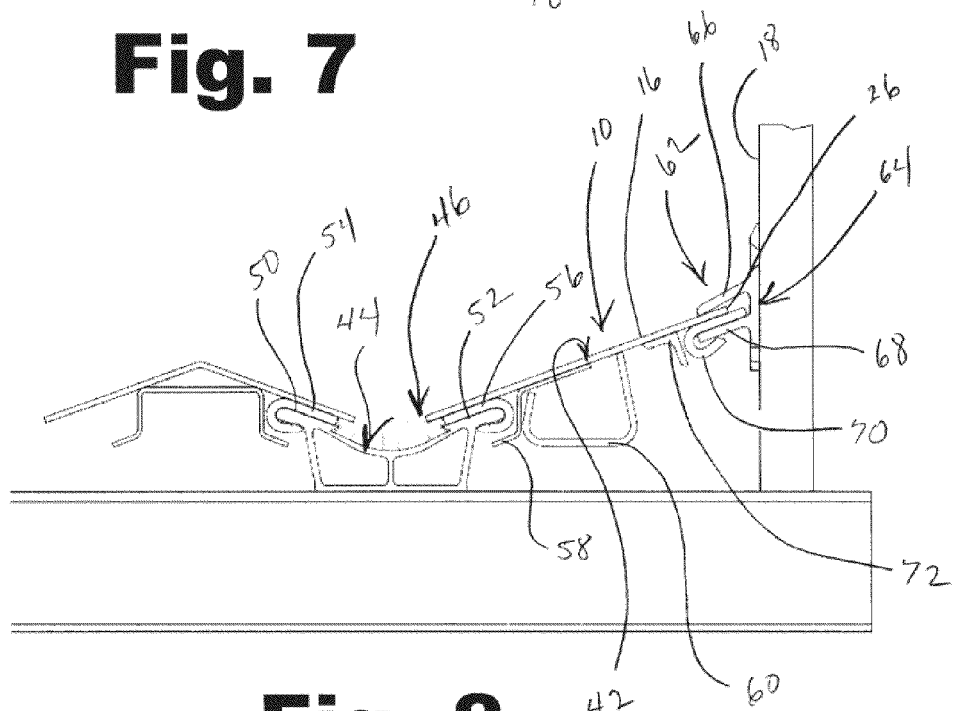
FIG. 8 is a view like FIG. 3, but also shows an alternative slat embodiment.
Figure 9:
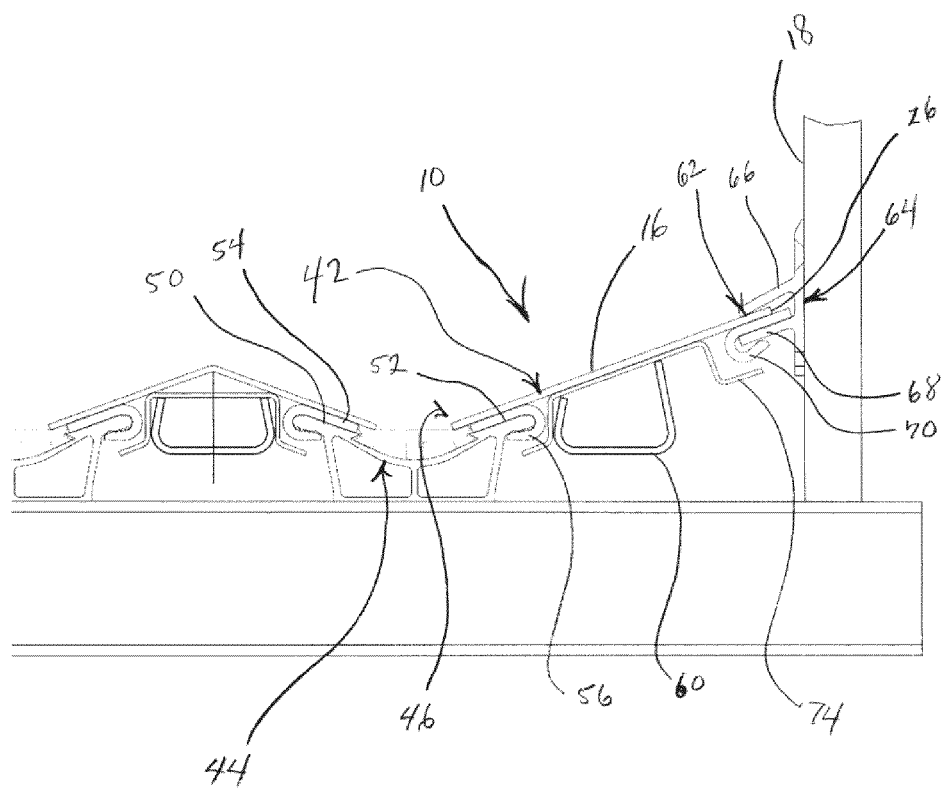
FIG. 9 is a view like FIG. 8, but shows yet another slat embodiment.

Referring now to FIGS. 7-9, alternative variations of the outer reciprocating slat 10 will now be described. Directing attention first to FIG. 7, the slat 10 illustrated there is a substitute for the modified "V" slat illustrated in FIGS. 2 and 6.

The modified slat 10 has a flat and angled surface (generally at 42) that extends from a fixed or stationary slat member 44 up to the wall 18. The lower lateral side edge of the modified slat (indicated generally at 46) is held in place by an underlying member 48 that holds the lower edge 46 in place relative to stationary slat 44. This may be done in different ways, as is further illustrated in FIGS. 8 and 9.

Referring to FIG. 8, for example, the stationary slat 44 has laterally protruding side portions 50, 52 that are surrounded by "J" bearings 54, 56, respectively. This general stationary slat construction is similar to what was illustrated in the '034 patent referenced above. The modified outer reciprocating slat 10 is held in place by a retaining member 58 that captures the slat 10 relative to protruding portion 52 of the stationary slat 44. The other underlying piece 60 adds structural support.

The upper lateral edge of the slat (indicated generally at 62) is captured by a guide piece, or guide (indicated generally at 64), that is mounted to the side wall 18 of the trailer. The outer end 26 of the slat is captured between portions 66, 68 of the guide. It may be preferred to use another "J" bearing 70 to facilitate sliding movement of upper end 26 within guide 64. The slat 10 may also have an underlying bracket 72 that helps retain the slat and prevent it from shifting too much side-to-side.

FIG. 9 is yet another alternative to the embodiments shown in FIG. 8. In FIG. 9, however, the retaining member 58 is extended as a single piece and has an opposite end 74 that helps to capture and hold the upper edge 26 of outer reciprocating slat 10 within guide 64.

The variations illustrated in FIGS. 7-9 are designs under consideration as of the time the patent application document was filed. Time may prove that one or more versions of these alternative designs turns out to be more or less suitable than the version depicted in FIGS. 1-6. Regardless of the specific structural configuration, in all cases, it is important that the upper or outer end 26 of the upwardly extending portion of slat 10 have an elevation above what functions as the normal elevation of the load-carrying surface, so that load material is directed away from the base of the trailer's wall 18. For example, it should be relatively clear to a skilled person that the inverted "V" floor illustrated has a series of peaks and valleys where the precise elevation of the load-carrying surface is no higher than the highest peak and no lower than the lowest valley and may lie at some intermediate level. In all cases, however, the elevation is below the vertical location of the outer lateral end 26 of the outer reciprocating slat 10.

Similarly, while the improved outer slat 10 is described in conjunction with the inverted "V" shape, it is to be understood that this improvement may also be well-suited for use in other reciprocating slat conveyor designs such as, for example, flat-surfaced conveyors where the load-carrying surfaces of the slats are essentially co-planar. These alternative reciprocating slat configurations may have similar clean-out problems, depending on load or material type.

The invention as described above is not to be limited by the foregoing description. Instead, the invention is to be limited only by the patent claim or claims that follow.

What is claimed is:

1. For use in combination with a plurality of reciprocating floor slats that unload material as a load-carrying floor between parallel side walls of a trailer, the reciprocating slats being spaced apart and carried by a plurality of stationary load-bearing slats, the stationary slats being fixed in position and non-moving relative to the material, an improved outer reciprocating slat that is positioned on the outer-most lateral side of the plurality of reciprocating floor slats, nearest the trailer's respective side wall, wherein the outer reciprocating slat is supported by at least one stationary slat, the outer reciprocating slat including a load bearing surface that reciprocates adjacent to the trailer side wall, the load bearing surface having a portion that extends laterally, along the length of the slat, and upwardly and toward the trailer's side wall, the laterally and upwardly extending portion of the load bearing surface of the outer reciprocating slat having an edge that terminates near the trailer's side wall in a manner so that the edge is above the normal load-carrying floor elevation of the plurality of reciprocating floor slats that are inward of the outer slat, to facilitate the prevention of material from being captured between the outer slat and the trailer wall.

2. For use in combination with a plurality of reciprocating floor slats that unload material as a load-carrying floor between parallel side walls of a trailer, the reciprocating slats being spaced apart and carried by a plurality of stationary slats, the stationary slats being fixed in position and non-moving relative to the material, an improved outer reciprocating slat that is positioned on the outer-most lateral side of the plurality of reciprocating floor slats, nearest the trailer's respective side wall, wherein the outer reciprocating slat is supported by at least one load-bearing stationary slat, the outer reciprocating slat including an angled load-bearing surface that reciprocates adjacent the trailer's side wall, the angled load-bearing surface extending laterally, along the length of the slat, and upwardly and toward the trailer's side wall, the angled load-bearing surface having an upper edge that terminates adjacent to the trailer's side wall, and wherein the upper edge is captured by a guide member in a manner so that the upper edge may reciprocate back and forth near the wall, and further, the guide member overlapping the upper edge in a manner so that material is prevented from passing between the guide member and the upper edge, and still further, the angled load-bearing surface having a lower lateral edge, below the vertical height of the upper edge, the lower edge riding on a lateral portion of a stationary slat.

\* \* \* \* \*